UNITED STATES PATENT OFFICE.

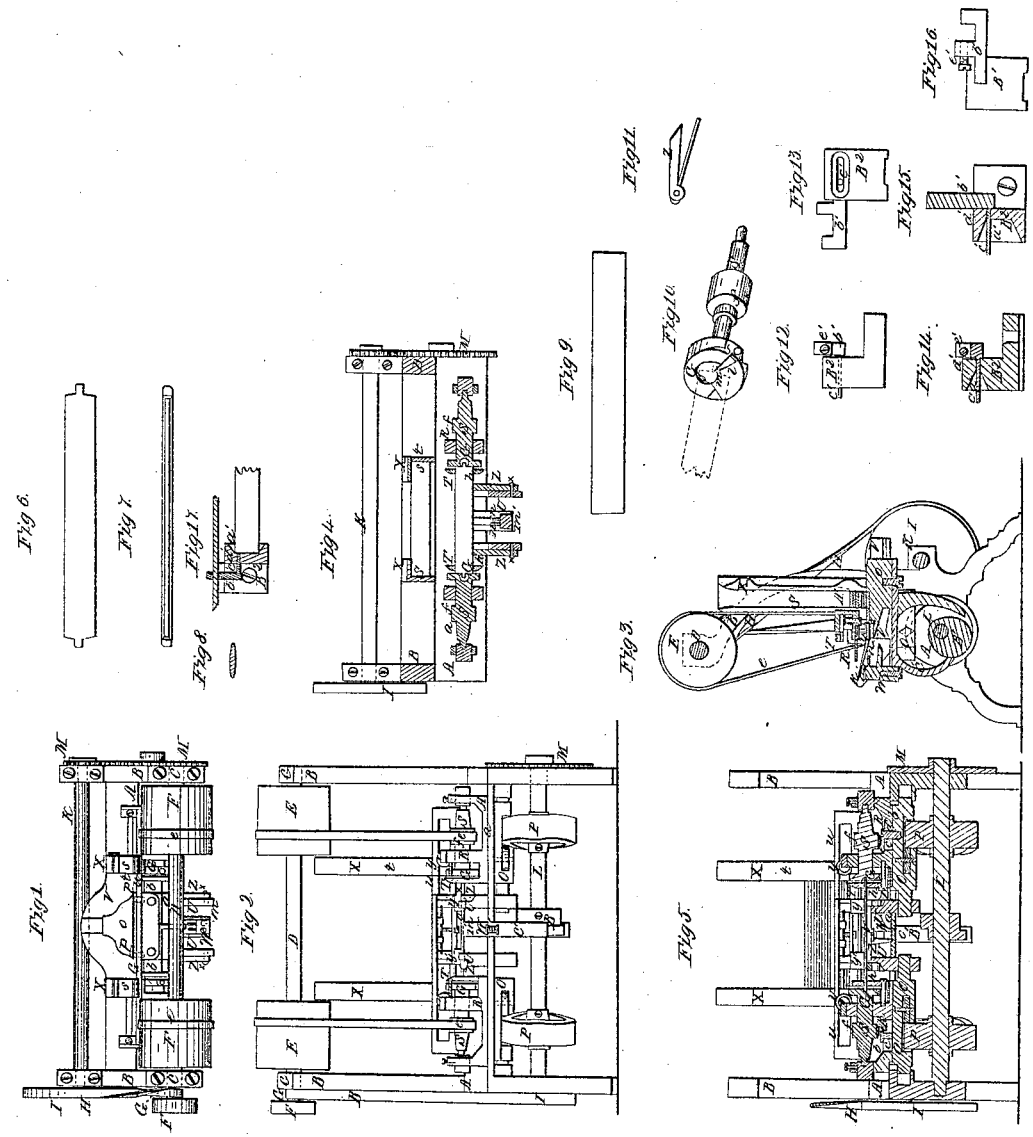

STEPHEN JACKSON, OF OSSIPEE, NEW HAMPSHIRE, ASSIGNOR TO DAVID L. HODSDON, OF SOMERSWORTH, NEW HAMPSHIRE.

BLIND-SLAT MACHINE.

Specification of Letters Patent No. 28,809, dated June 19, 1860.

*To all whom it may concern:*

Be it known that I, STEPHEN JACKSON, of Ossipee, in the county of Carroll and State of New Hampshire, have invented an Improved Machine for Piercing the Edge of a Blind-Slat and Making Round Journals or Tenons on its Two Opposite Ends; and I do hereby declare that the same is fully described and represented in the following specification and the accompanying drawings, of which—

Figure 1, is a top view. Fig. 2, a front elevation. Fig. 3, a vertical, transverse and central section of such machine. Fig. 4, is a horizontal section, and Fig. 5, a vertical and longitudinal section of it, each of which being taken through the cutter mandrels to be hereinafter described. Fig. 6, is a top view, Fig. 7 an edge view, and Fig. 8, a transverse section of one of the blind slats, as it appears after being discharged from the machine. Fig. 9, is a top of a slat as it appears prior to being introduced into the slat rests of the hopper and the feeding mechanism.

In the drawings, A, exhibits the frame of the machine; it being constructed very similar to that of a common turning lathe. On the upper part of the said frame, two standards, B, B, are erected for the purpose of supporting the boxes, C, C, of a driving shaft, D. The said shaft, D, carries two long drums, E, E, a driving pulley F, and a smaller pulley, G. Around the latter pulley, a crossed endless belt H, passes and works around the circumference of a separate pulley, I, fixed upon another horizontal shaft, K, that is arranged at the rear part of the frame, A, as shown in the drawings. Within the said frame, A, there is a third shaft, L, it being situated as shown in Figs. 2, and 3. This latter shaft, (L) is driven by two gears, M, M, applied to it, and the shaft K, as shown in the drawings.

The top plate or part, a, of the frame, has two grooves, b, b, formed longitudinally in it, for the reception of two slides or carriages, O, O, which are arranged as shown in Figs. 2, and 5, and receive longitudinal motions from two cams, P, P, fixed upon the shaft, L. The said cams may be so applied to the shaft as to be capable of being adjusted in longitudinal directions thereon, and of being fixed to the shaft as occasion may require. Each of the slides or carriages, O, O, serves to support a puppet, R, which is placed on the top of the slide, O, and so applied thereto as to be capable of being adjusted longitudinally thereon, and of being fastened thereto when so adjusted. For this purpose each puppet is constructed with a slot, c, extending down through its base plate, as shown in Fig. 5, a clamp screw, d, being carried downward through the slot and into the slide, O. Each of the puppets supports a mandrel, S, that is driven by a belt, e, that passes about one of the drums, E, and a pulley f, attached to the mandrel; the same being as shown in the drawings. Furthermore, upon the inner end of each mandrel, a cutter head or stock, G, is affixed; there being directly in advance of said cutter head, what may be termed an end guide, T, the same consisting of a vertical plate of metal, constructed with a flaring mouth or guide, h, as shown in Figs. 4 and 5.

Fig. 10, exhibits an inner end view of one of the cutter stocks, and its spiral cutter. The said cutter is exhibited at l, as constructed with a spiral cutting edge, m, formed with relation to an end view of the blind slat, as shown in Fig. 10; wherein an end of the blind slat and its tenon is exhibited by red lines. Furthermore, the face of the cutter is made dishing or slightly conical, so as to form the end of the slat flaring with reference to the tenon, as shown in Fig. 10. When the slat is forced against the cutter, while the latter is in revolution, such cutter will operate with a drawing cut, or stroke, which will commence at the edge of the slat, and terminate at the circumference of the cylindrical tenon, such tenon being formed on the slat while the wood of the slat is being removed by the cutter. By such mode of forming and operating the cutter, the end of the slat, as well as the tenon, will be cut very smoothly, or without burs or ragged edges.

Between the two end guides, T, there are arranged two transverse rails, U, U, each of which inclines downward toward a platform, V, that is raised somewhat above the top, a, as shown in Fig. 3. Underneath the said platform, there is a slider, W, upon whose front end there is a projection, m', from which the awls or piercers, n, n, extend inward, such awls or piercers being for the purpose of punching staple holes in the edge of the blind slat. Furthermore, there is affixed to the rear part of the slider, an impeller, o, that rests upon the platform, A, as shown in the drawings. Two small starts or rests, p, p, project from the inner edge of the impeller, and are formed sloping or angular for the purpose of extending underneath a blind slat, so as to prevent it from tipping out of a horizontal position, while being forced forward, which it would be otherwise likely to do, on account of its being thinner at its edges than it is in its middle.

Extending vertically above the platform, V, there are two slat rests, X, X, each of which is constructed with a vertical channel, s, one side of which, viz., t, being so applied to the remainder of the rest, X, as to enable it to be adjustable with reference to the other side, the same being for the purpose of enabling each slat rest to be adapted to receive a slat of any desirable width. Furthermore, both of the slat rests X, are so applied to the platform V, by means of a slotted bar, u, and clamping screws, v v, as to be capable of being moved either toward or away from one another, in order that they may be adjusted for the reception of a blind slat of any desirable length. Two spring pressers Y', Y', are arranged over the platform V, as shown in Figs. 1, 3, and 5, their office being to press the slat closely upon the platform, after such slat may have been advanced into a proper position for being cut and pricked.

To the outer side of each of the rails, U, a spring cam stop Z, is affixed by a pin x, as shown in Figs. 1, 2, and 3, and also in Fig. 11, which represents a side view of the cam stop and its spring as affixed to one of the said rails, the spring serving to elevate the cam stop after each depression of it. Such cam stop turns vertically on the pin x. The inner end of each of the said stops is beveled, as shown in Fig. 11, and serves to arrest any forward movement of a blind slat, after it may have been advanced into a suitable position for the cutters to approach it and preparatory to such approach. After the slat has been reduced by the cutters, and they have receded from it, another slat from the pile will be pressed forward, and against the finished slat, so as to press the latter against the spring cam stops, and cause them to move downward, and there remain until the slat may be discharged from under the spring pressers and be received upon the inclined rails, U, U. The inclination of the top surfaces of such rails, are to insure the discharged slat being carried entirely above the path of movement of the awls, n, n, or their carrier, m.

In the operation of the above described machine, the two slat rests, X, X, and the platform, V, above which they extend, constitute a hopper for holding a pack or pile of blind slats, one being arranged on top of the other as shown at A', in Fig. 3. By means of the impeller o, of the feeding apparatus, each blind slat in succession will be advanced from the pile, or forced beyond the same and underneath the spring pressers, and into a position to be cut and pricked. On the attainment of such position by each slat, the cutters will be advanced so as to cut the two ends of the slat and form them with journals. While the cutters are in operation and the slat is within the end guides, T, T, the awls are moved up to the front edge of the slat and caused to puncture the same. Before the next slat to be cut and pricked, may be moved forward and from the hopper, the awls are withdrawn from the advanced slat, so as to enable it to be expelled from the machine. The movements of the awls and the impeller are produced by the action of a cam B', against two curved projections C', D', extended from the slider, W, as shown in Figs. 2 and 3, the said cam being affixed to and rotated by the cam shaft L.

One advantage which results from making each of the puppets R, R separate from its slider, O, and applicable thereto as specified, consists, in such enabling the puppets to be removed from the sliders, and to have common end compressing or crimping blocks substituted for them, the purpose of such blocks being to compress the ends of the blind slat, or make each of them slightly wedging; so as to enable it to be driven easily into the groove in the blind frame destined to receive it. These latter kinds of slats or those so to be compressed are not intended to have journals cut on their ends, as they are to be stationary in their frame when the blind is completed.

Fig. 12, is a side view of one of the compressing or crimping blocks, and its reliever. Fig. 13, is an inner end view of such. Fig. 14, is a vertical section, and Fig. 15, is a horizontal section of the same. Fig. 16, is a rear end elevation of the block, and shows a side view of the reliever.

Each of the said blocks, $B^2$, is formed with an elongated, wedged formed recess, a', suitable to receive and compress the end of a slat. The reliever consists of a pin or wire b', and a carrier, c', the pin being extended from the carrier, and through a passage, d', made in the block, and leading into the recess, a', as shown in Figs. 14, 15 and 17.

When the compressing blocks are employed in lieu of the puppets, their mandrels and cutters, the said blocks are to be respectively fastened to the slides, O, O, in, or about in, the positions of the end guides, T, T, and so that when such blocks are moved toward each other, and a blind slat, held upon the platform V, by the spring pressers, Y', Y', the two ends of the slat may enter the recesses, of the compressing blocks. The object of the reliever of each compressing block, is to discharge the slat from the recess of the block, such reliever being fastened to the slotted bar, $u$, by means of a clamp screw $e'$.

Fig. 17, is a horizontal section of the slat, the compressing block, the reliever, and the bar $u$; in their relative positions to each other. As the relievers are stationary at all times, while in place on the bar, $u$, they serve to maintain the blind slat stationary, while the blocks, $B^2$, $B^2$, are being moved backward or away from it.

Thus it will be seen that by the peculiar construction of my said machine, it may be used either for tenoning and pricking rolling slats, or for compressing or crimping stationary or fixed slats.

I do not claim a machine or combination consisting both of machinery for piercing the edges of a blind slat, and mechanism for making journals or cylindrical tenons on the two ends of such slat.

I claim:

1. In combination with the awls and cutters or mechanism for piercing the edges of a blind slat, and forming it with tenons on its ends as specified, the slat hopper (or rests X, X and platform V,) and the impeller, $o$, or mechanism for successively removing the slats therefrom and feeding them forward between and away from the journal cutter.

2. The self acting or spring cam stops, Z, Z, in combination with the impeller, $o$, the platform V, and the inclined rails U, U, the said cam stops being arranged and applied substantially in manner and to operate as specified.

3. The combination of inclined rails, U, U, with the platform, V, and the awls or awl carrier, the object of such inclined rails, being to cause an inclination out of the path of the awls of a slat, while being expelled from the machine.

4. The combination of the end guides and slat holders, T, T, with the tenon cutting mechanism, the platform and spring pressers, or slat supporting devices, as specified.

5. The combination of the rests, $p$, $p$, with the impeller, $o$, in manner and for the purpose, substantially as specified.

STEPHEN JACKSON.

Witnesses:
R. H. EDDY,
F. P. HALE, JR.